United States Patent [19]
Giesbert et al.

[11] Patent Number: 5,087,847
[45] Date of Patent: Feb. 11, 1992

[54] BEARING RETAINER FOR ELECTROMAGNETIC ROTATING ACTUATOR

[75] Inventors: Michael Giesbert, Tamm; Johannes Meiwes, Markgroeningen; Friedrich Wendel, Weissach; Dieter Dick, Muehlacker; Henning Teiwes, Ditzingen; Helmut Schellhase, Stuttgart, all of Fed. Rep. of Germany

[73] Assignee: Robert Bosch GmbH, Stuttgart, Fed. Rep. of Germany

[21] Appl. No.: 692,881

[22] Filed: Apr. 29, 1991

[30] Foreign Application Priority Data

Jun. 21, 1990 [DE] Fed. Rep. of Germany ....... 4019749

[51] Int. Cl.$^5$ .................... H02K 5/16; H02K 7/08; F16C 35/06; F16C 27/04
[52] U.S. Cl. ...................... 310/90; 267/161; 384/517; 310/42
[58] Field of Search ............... 29/598; 267/158, 159, 267/161, 163; 310/21, 42, 90, 116, 156, 83; 335/272

[56] References Cited

U.S. PATENT DOCUMENTS

| | | | |
|---|---|---|---|
| 2,779,883 | 1/1957 | Schumann | 384/517 |
| 3,272,999 | 9/1966 | Turk | 310/90 |
| 4,364,615 | 12/1982 | Euler | 384/517 |
| 4,647,230 | 3/1987 | Friedrich et al. | 384/903 |
| 5,027,024 | 6/1991 | Slayton | 310/90 |

FOREIGN PATENT DOCUMENTS

| | | |
|---|---|---|
| 3926972 | 2/1991 | Fed. Rep. of Germany . |
| 1285256 | 1/1962 | France .................. 267/163 |

Primary Examiner—Steven L. Stephan
Assistant Examiner—D. L. Rebsch
Attorney, Agent, or Firm—Edwin E. Greigg; Ronald E. Greigg

[57] ABSTRACT

An electromagnetic rotating adjuster that has a servomotor with a can-shaped rotor, which is supported by means of a shaft via a first roller bearing and a second roller bearing, in which the disposition of the roller bearings in the one piece housing is inaccessible. For axial fixation of one second roller bearing, a spring washer is disposed in a second bearing opening and the second roller bearing is pressed against it, the outer race of the bearing having a detent groove on its circumference which groove is engaged by resilient detent tongues of a detent ring, supported in an annular groove of the housing. This assures secure fixation of the second roller bearing in the axial direction in a way that both suits the needs of large-scale mass production and is economical. The electromagnetic rotating adjuster may be used in control of the idling air in internal combustion engines. The resilient tongues and washer facilitate removal, as well as installation, of the rotor assembly.

4 Claims, 1 Drawing Sheet

BEARING RETAINER FOR ELECTROMAGNETIC ROTATING ACTUATOR

BACKGROUND OF THE INVENTION

The invention is based on an electromagnetic rotating actuator as defined hereinafter. An electromagnetic rotating actuator has already been proposed (German Patent Application P 39 26 912.4), in which a roller bearing at a poorly accessible location is axially held by means of a spring washer and an angle washer that locks into place in a detent, so that the roller bearing remains fixed during assembly and operation of the rotating actuator. However, this fixation of the roller bearing is neither suitable for machine assembly in mass production nor is it economical, nor is it suitable for use with a housing that extends across the entire servomotor.

OBJECT AND SUMMARY OF THE INVENTION

The rotating actuator according to the invention has an advantage over the prior art that even at an inaccessible installation site for the roller bearing, economical fixation of a roller bearing in a manner suitable for large-scale mass production, and that also enables robot assembly, is attained. The resultant fixation of the roller bearing withstands major shaking strains in the motor vehicle.

It is particularly advantageous to use a one-piece housing that extends across not only the throttle device but also the rotor and stator, so that only one seal at one cap is necessary.

It is also advantageous to make the detent ring from a sheet-metal strip, so that it can be resiliently compressed in the radial direction and engages a detent groove in the roller bearing with its detent tongues.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
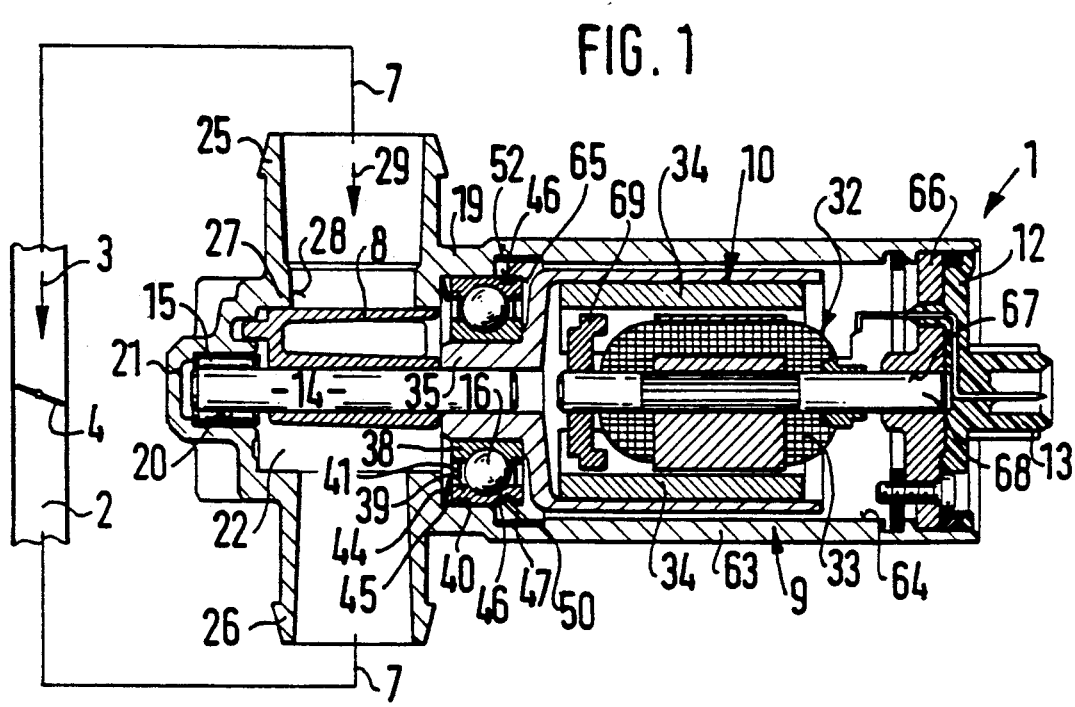
FIG. 1 shows an electromagnetic rotating actuator embodied in accordance with the invention.

A throttle cross section in a line carrying an operating medium in an internal combustion engine is controlled by a rotating actuator 1 as shown in FIG. 1, in particular to regulate the idling rpm of the engine, through the air intake tube 2 of which combustion air flows past the throttle valve 4 in the direction of the arrow to the engine, not shown. A bypass line 7 which bypasses the throttle valve 4, and the flow cross section of which can be varied by means of a throttle device embodied as a rotary slide valve 8, communicates with the air intake tube 2. The rotating actuator 1 has a servomotor 9, which is embodied as a brushless electric motor; its rotor 10 acts on the rotary slide valve 8, and it can be triggered, via a plug 13 embodied on a cap 12, by an electronic control unit (not shown) as a function of engine operating parameters. Upon excitation of the servomotor 9, the rotor 10 turns a shaft 14 on which it is secured and which is rotatably supported in a housing 19 via a first roller bearing 15 and a second roller bearing 16. The first roller bearing 15 is embodied as a needle bearing, for example, and is pressed into a first bearing opening 20, embodied as a blind bore, in the housing bottom 21 of the cup-shaped housing 19. The rotary slide valve 8, embodied as a tubular segment, is connected to the shaft 14 between the first roller bearing 15 and the second roller bearing 16 and protrudes into a swivel chamber 22 of the housing 19 that intersects the bypass line 7. Through the swivel chamber 22, an inflow neck 25 on one side communicates with the air intake tube 2 upstream of the throttle valve, and an outflow neck 26 on the other side communicates with the air intake tube 2 downstream of the throttle valve 4. The circumference of the tubular segmental rotary slide valve 8 protrudes as nearly as possible to the wall of the swivel chamber 22. At least one control opening 28 is cut out in the wall 27 of the swivel chamber 22 oriented toward the inflow neck 25, and this opening can be opened to a greater or lesser extent by the rotary slide valve 8. An arrow 29 indicates the airflow direction in the inflow neck 25.

Figure 2:
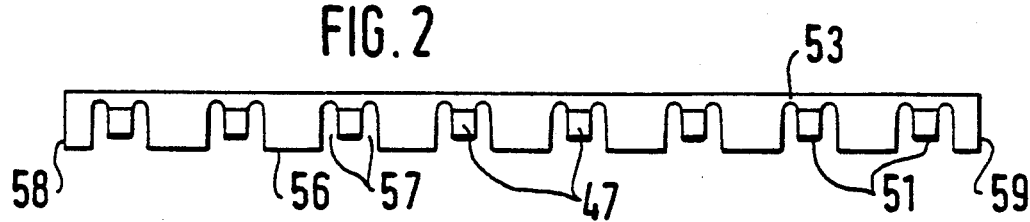
FIG. 2 shows a sheet-metal strip for producing a detent ring.
Figure 3:
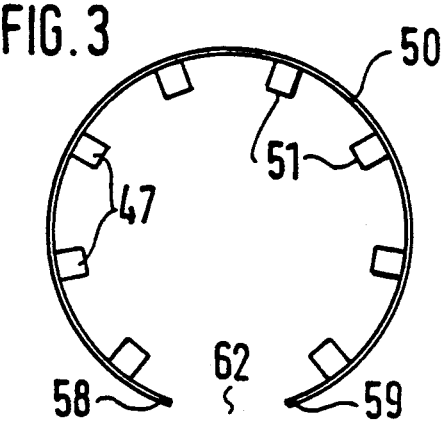
FIG. 3 shows a detent ring.
Figure 4:
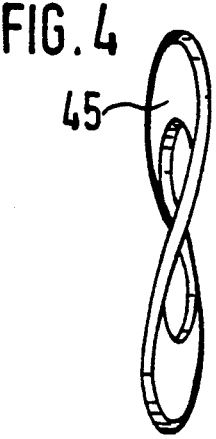
FIG. 4 shows a spring washer.

The servomotor 9 comprises a central stationary stator 32 with field windings 33 and the can-shaped rotor 10, which has two permanent magnet segments 34 disposed on its cylindrical jacket-shaped wall. The permanent magnet segments 34 are in the form of shells and cover an angular range of approximately 135° each. The can-shaped rotor 10 has a hub 35 facing toward the rotary slide valve 8 that fits over the shaft 14 and is secured to it. An inner race 38 of the second roller bearing 16, which is embodied as a ball bearing, is firmly seated on the hub 35, and an outer race 39 of the second roller bearing 16 is thrust into a second bearing opening 40 of the housing 19. In a known manner, the second roller bearing 16 has cover disks 41 covering the roller bodies, so that virtually no exchange of media takes place via the roller bearing in the axial direction between the side of the second roller bearing toward the rotary slide valve 8 and the side toward the stator 32. Remote from the stator 32, the second bearing opening 40 is defined by a bearing shoulder 44 of the housing 19. Upon insertion of the second roller bearing 16 into the second bearing opening 40, a spring washer 45 is braced between the bearing shoulder 44 and the second roller bearing 16, exerting a force in the direction of the stator 32 upon the second roller bearing 16. A spring washer of this kind is shown for example in FIG. 4 and can have the shape of a so-called cup-spring, a zig-zag spring, or the like. The outer race 39 of the second roller bearing 16 has an encompassing detent groove 46 on its circumference, which is resiliently engaged by the free ends 51 of detent tongues 47 of a resilient detent ring 50. The detent ring 50 is supported in an annular groove 52 of the housing 19. The detent ring 50 is formed from a sheet-metal strip 53, which has two separating slits 57 each per long side 56 of the strip 53 that extend transversely to the longitudinal axis of the sheet-metal strip 53 and are spaced apart from one another; each two slits define one of the detent tongues 47. The detent tongues 47 are bent at an incline out of the plane of the sheet-metal strip. FIG. 2 shows a sheet-metal strip 53. In FIG. 3, the sheet-metal strip 53 is curved in the manner of the detent ring 50, such that its two ends 58 and 59 form an axially extending gap 62, and the detent tongues 47 extend pointing radially inward.

The openings provided in the housing 19 have a stepped diameter, so that the diameter of the first bearing opening 20 is smaller than the diameter of the swivel chamber 22, and the diameter of the swivel chamber 22 in turn is smaller than the diameter of the second bearing opening 40. With a tubular portion 63 adjoining the housing bottom 21, the one-piece housing 19 protrudes axially beyond not only the rotary slide valve 8 but also the rotor 10 and stator 32, and it has an inside opening 64 that is of larger diameter than the rotor 10 and the second bearing opening 40. For assembly, first the first roller bearing 15 is thrust into the first bearing opening 20 and the detent ring 50 is thrust into the annular groove 52 in the housing 19, and the spring washer 45 is laid in the second bearing opening 40. After that, the rotor 10 with the shaft 14 along with the roller bearing 16 fitted onto it and the rotary slide valve 8 is introduced into the inside opening 64 of the housing 19, until the second roller bearing 16, displaced counter to the force of the spring washer 45, assumes a position in which the detent tongues 47, initially bent in the insertion direction, lock into place in the detent groove 46 of the second roller bearing 16. The detent tongues 47 engage the detent groove 46 resiliently in such a way that they prevent the second roller bearing 16 from being pulled out of the second bearing opening 40 in response to forces occurring during operation of the rotating actuator. In a further feature of the invention, it is possible to dispense with a detent groove 46 on the outer race 39 of the second roller bearing 16, if the detent ring 50 is supported in the annular groove 52 in such a way that when the second roller bearing 16 has been thrust into the second bearing opening 40, the detent tongues 47 engage an end face 65 toward the stator 32 and exert a force in the direction toward the spring washer 45.

It is also easy to remove the rotor 10, because by slipping a sleeve over the rotor 10 the detent tongues 47 can be bent toward the wall of the inside opening 64, thus cancelling their detent action. In this condition, the rotor 10 can be pulled out of the housing 19.

Securing the second roller bearing 16 as described can also be employed for the first roller bearing 15, by placing a spring washer in the first bearing opening 20 and providing the outer race of the first roller bearing 15 with a detent groove engaged by detent tongues of a detent ring disposed in an annular groove of the housing. One detent groove can also be dispensed with if the detent ring is supported such that the detent tongues engage a end face of the first roller bearing that faces toward the rotary slide valve 8.

Between the cap 12 inserted into the housing in a sealed manner and the rotor 10, a base plate 66 is inserted into the housing 19 that has a central retaining bore 67 into which a shaft 68 of the stator 32 is pressed so that it is stationary. The shaft 68 extends into the rotor 10, and on its end remote from the base plate 66 it has a restoring element 69 of ferromagnetic material, which like the stator 32, is immobile and is located, in the form of a thin disk, within the operating range of the permanent magnet segments 34. The restoring element 69 extends radially almost up to the permanent magnet segments 34, but without touching them. In the nonexcited state of the servomotor 9, after the end of the excitation, the rotor 10, and thus the rotary slide valve 8 as well, are rotated into a predetermined rotational position and held there by the magnetic field of the permanent magnet segments 34, which cooperates with the restoring element.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An electromagnetic rotating actuator, for controlling a throttle cross section of a control opening by a throttle device in a line carrying an operating medium of an internal combustion engine, having a one-piece housing and a servomotor, which has both a stator that is stationary relative to the housing and a rotatable rotor, with which said throttle device that opens said control opening to a variable extent is connected, a bearing opening, at least one roller bearing disposed in said bearing opening, for rotatably supporting said rotatable rotor wherein the bearing opening is defined by a radially extending bearing shoulder (44), a spring washer (45) is disposed between the bearing shoulder and the at least one roller bearing 15, 16), to exert a force in an axial direction upon the at least one roller bearing (15, 16), a resilient detent ring (50) including resilient detent tongues including free ends thereon, and at least one roller bearing (15, 16) is engaged by said free ends (51) of said resilient detent tongues (47) secured on a said resilient detent ring (50) which is supported in an annular groove (52) of the housing (19) in such a way that the at least one roller bearing (15, 16) is pressed toward the spring washer (45).

2. A rotating actuator as defined by claim 1, in which the resilient detent tongues (47), with their free ends (51), engage an encompassing detent groove (46) on a circumference of the at least one roller bearing (15, 16).

3. A rotating actuator as defined by claim 1, in which the resilient detent ring (50) is curved, from a sheet-metal strip (53) provided with detent tongues (47) cut from the detent ring and bent out of said ring at an incline, in such a manner that an axially extending gap (62) is formed between its two ends (58, 59), and the detent tongues (47) point radially inward.

4. A rotating actuator as defined by claim 1, in which the one-piece housing (19) extends across the throttle device (8) as well as across the rotor (10) and the stator (32).

* * * * *